United States Patent
Hutton

(10) Patent No.: US 7,562,907 B2
(45) Date of Patent: Jul. 21, 2009

(54) STABILIZED TAP MOUNTING ASSEMBLY

(75) Inventor: Peter B. Hutton, Houston, TX (US)

(73) Assignee: Century Industries Company, Halifax, Nova Scotia (CA)

(*) Notice: Subject to any disclaimer, the term of this patent is extended or adjusted under 35 U.S.C. 154(b) by 0 days.

(21) Appl. No.: 11/017,757

(22) Filed: Dec. 22, 2004

(65) Prior Publication Data

US 2005/0151372 A1    Jul. 14, 2005

Related U.S. Application Data

(63) Continuation of application No. 09/959,101, filed as application No. PCT/US00/02658 on Feb. 3, 2000, now Pat. No. 6,871,881.

(60) Provisional application No. 60/129,859, filed on Apr. 19, 1999.

(51) Int. Cl.
*F16L 41/04* (2006.01)
*F16L 41/06* (2006.01)
*B21D 39/00* (2006.01)

(52) U.S. Cl. .................. 285/219; 285/143.1; 137/317; 29/282

(58) Field of Classification Search .......... 285/219, 285/143.1, 114, 116, 89, 220, 221, 115, 93; 137/317, 318; 29/282
See application file for complete search history.

(56) References Cited

U.S. PATENT DOCUMENTS

| | | | |
|---|---|---|---|
| 788,172 A | 4/1905 | Seiler | |
| 1,201,746 A | 10/1916 | Lavercombe | |
| 1,812,794 A | 6/1931 | Lally | |
| 2,238,169 A | 4/1941 | Heyn et al. | |
| 2,449,588 A | 9/1948 | Clafford | |
| 2,465,495 A | 3/1949 | Taliento | |
| 2,679,411 A | 5/1954 | Moore | |
| 3,362,731 A | 1/1968 | Gasche et al. | |
| 4,582,089 A | 4/1986 | Nimberger | |
| 4,672,728 A | 6/1987 | Nimberger | |
| 4,878,696 A * | 11/1989 | Walker | 285/61 |
| 4,920,626 A | 5/1990 | Nimberger | |
| 5,292,155 A | 3/1994 | Bell et al. | |

* cited by examiner

*Primary Examiner*—James M Hewitt

(57) ABSTRACT

A method and apparatus are directed to reduce the load from the threads on taps on an orifice plate or orifice fitting. The apparatus includes a tap (3) having an NPT threaded end (1) and a flanged end (12) and an intermediate flange (13) which engages with a stabilizing tube (2) placed around the tap (3). In use, a stabilizing nut (1), previously threaded on the stabilizing tube (2), is unthreaded thereby forcing the stabilizing tube (2) against the intermediate flange (13) and transferring at least some of the weight off the threads (1) of the tap (3).

7 Claims, 3 Drawing Sheets

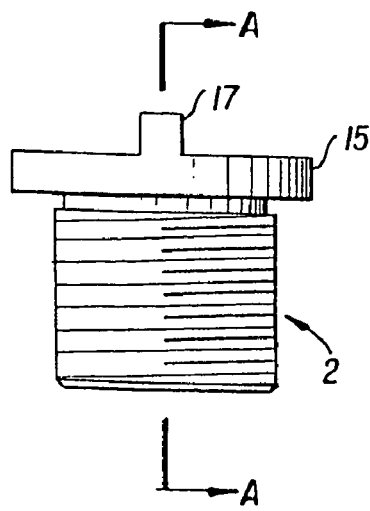
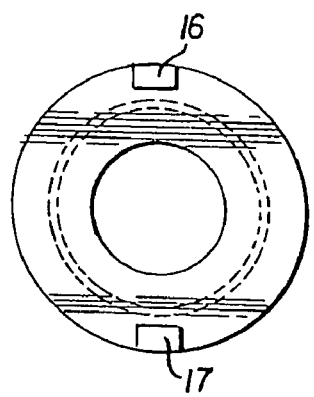
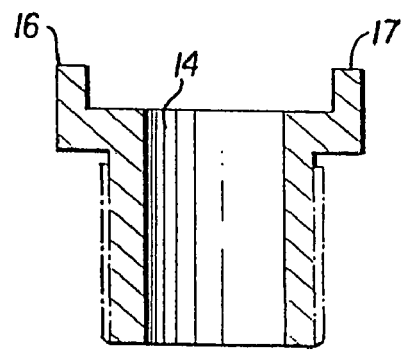
FIG. 4     FIG. 5     FIG. 6
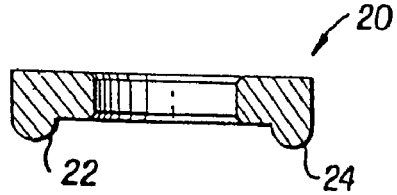
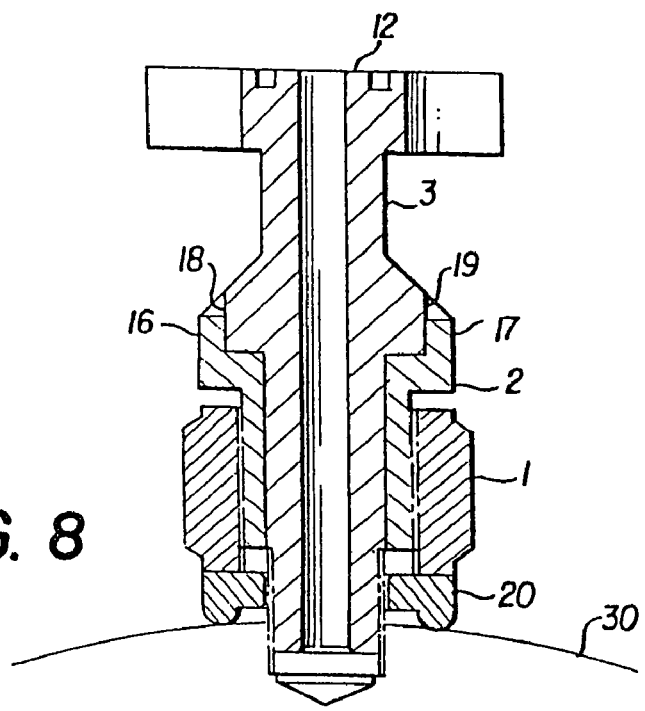
FIG. 7     FIG. 8

STABILIZED TAP MOUNTING ASSEMBLY

PRIORITY

This application is a continuation application of application Ser. No. 09/959,101, filed on Nov. 15, 2001, now U.S. Pat. No. 6,871,881, and claims the benefits under 35 U.S.C. § 120 of the prior copending application, which is hereby incorporated by reference in its entirety into this continuing application.

The prior copending application is a 371 application of International Application No. PCT/US00/02658, filed Feb. 3, 2000, claiming the benefit of U.S. patent application No. 60/129,859, filed Apr. 19, 1999, the entire disclosure of which is incorporated herein by reference.

BACKGROUND OF THE INVENTION

1. Field of the Invention

This invention relates to the remote sensing of pressure drops across an orifice plate in a pipeline and particularly to a stabilized tap mounting assembly to facilitate, stabilize and reduce vibration of the transmitter and associated apparatus, such as valved manifold blocks connecting the transmitter to taps on an orifice plate or orifice fitting.

2. Description of the Related Art

The gas industry makes extensive use of orifice plates for volume measurements. Orifice plates are artificial constrictions in a pipeline. As a result of this constriction, there is a pressure drop from the upstream side of the orifice plate to the downstream side of the orifice plate. There is a relationship between the pressure drop and the amount of gas flowing through the pipeline. The pressure drop can be measured, which in turn allows a determination of the flow through the pipeline.

The pressure drop is measured using electronic transmitters. These transmitters actually measure the pressures on both the upstream and downstream sides of the orifice plate and then record the difference between the two. Devices of this type are referred as differential pressure transmitters. There are numerous manufacturers of this type of device (e.g., Rosemount, Honeywell, Foxboro and others).

Orifice plate fittings (such as the type manufactured by Daniel Industries) and orifice flanges (manufactured by Daniel and others) are provided with holes (called taps) both upstream and downstream of the orifice plate. The taps are generally threaded holes, typically ½" female NPT (National Pipe Thread—a tapered thread designed to seal pressure tight).

It is necessary to incorporate valving systems between the orifice taps and the differential pressure transmitters. These valving systems need to include the following functions. Block valves to isolate the flow through the upstream and downstream taps (generally referred to as the high pressure side and the low pressure side), between the orifice flange or fitting and the transmitter. An equalizer valve, or valves, to control the connection between the high pressure passages and the low pressure passages. A vent valve, or valves, to allow trapped pressures to be bled off or to allow the passages to be purged of entrapped gases or liquids. Sometimes the vent valve(s) are incorporated into the transmitters.

The natural gas industry has evolved a number of specifications and requirements to minimize errors in the measurement of flow and to provide improved accuracy and response time. Some of these are:

1. The closer the transmitter is to the orifice plate the better.
2. The orifice size through the valving system from the orifice taps to the transmitter must be ⅜" in diameter.
3. The flow passages between the orifice taps to the transmitter should be as straight as possible. The ideal is a straight through passage. One 90 degree turn in the flow passage is permitted.

Another consideration is mounting the valve system and the transmitters to the orifice plate assembly. Conventional mounting, valving, and transmitter assemblies can weigh 40 pounds and, depending on the complexity of the assembly and the products used, up to 70 pounds. The pipeline system and the orifice flanges or fittings are subject to vibration. The valving and transmitter assemblies also tend to be leaned on by the instrumentation personnel.

Thus, there is a continuing need to provide an alternative connection method and apparatus to operatively fluidly couple the high and lower pressure taps about an orifice plate with a transmitter.

SUMMARY OF THE INVENTION

The device of the invention has been developed to provide a stabilized mount to permit conventional manifold/transmitter assemblies to be attached to orifice fittings. The novelty of this device is restricted to the stabilizing mount itself. The manifold shown in the attached drawings is commercially available through Century Valve and Machine of Calgary, Alberta, Canada and others.

The stabilized tap assembly is designed to mount to both orifice fittings (as manufactured by Daniel and others) as well as orifice flanges.

BRIEF DESCRIPTION OF THE DRAWINGS

FIG. 4 is a schematic side view of the stabilizing tube of FIGS. 1-2;

FIG. 5 is a top view of the stabilizing tube of FIG. 4;

FIG. 6 is a section along A-A of FIG. 4 of the stabilizing tube;

FIG. 7 is a schematic cross section of a flange shoe for use in mounting the tap of the invention on an orifice flange; and FIG. 8 is a cross sectional assembled view of the tap and flange shoe on an orifice flange.

DESCRIPTION OF THE PREFERRED EMBODIMENTS

Figure 1:
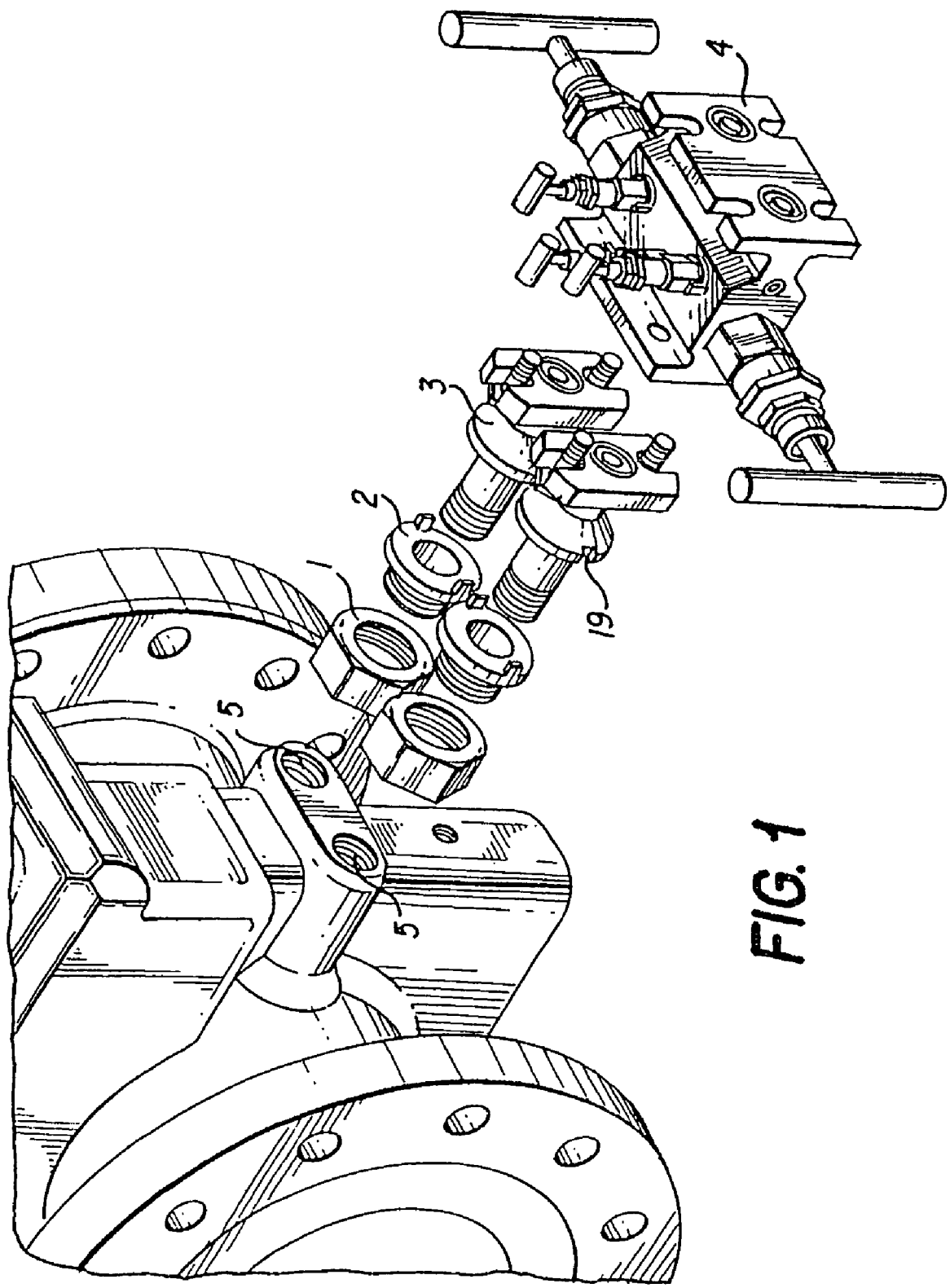
FIG. 1 is an exploded view of a typical transmitter and block manifold assembly for use with the stabilizing taps of the invention.
Figure 2:
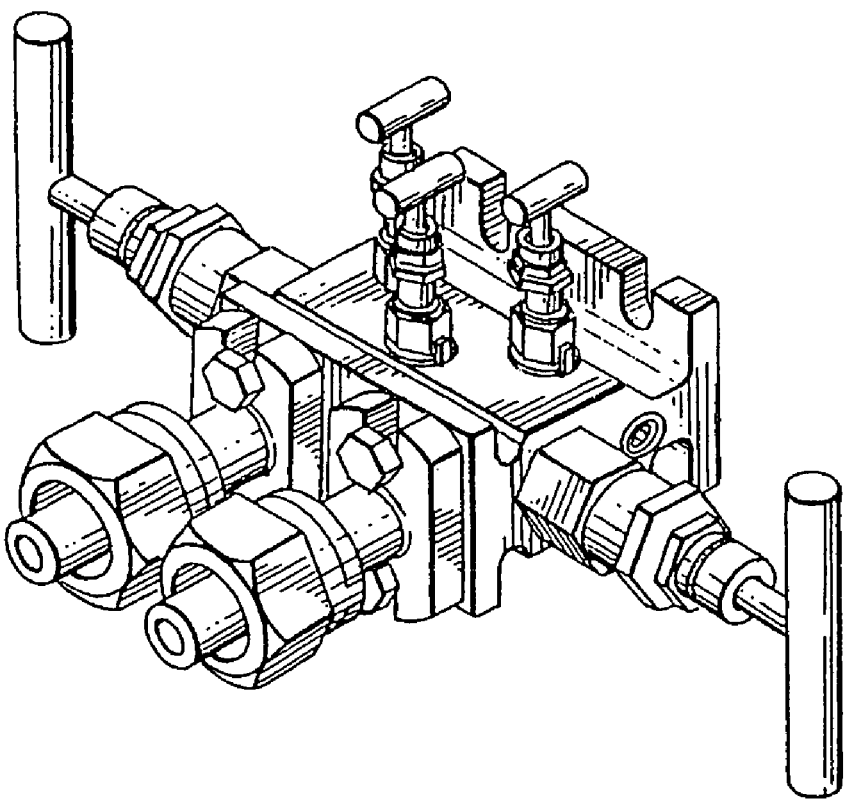
FIG. 2 is a schematic assembled view of the taps of the invention with a conventional manifold.
Figure 3:
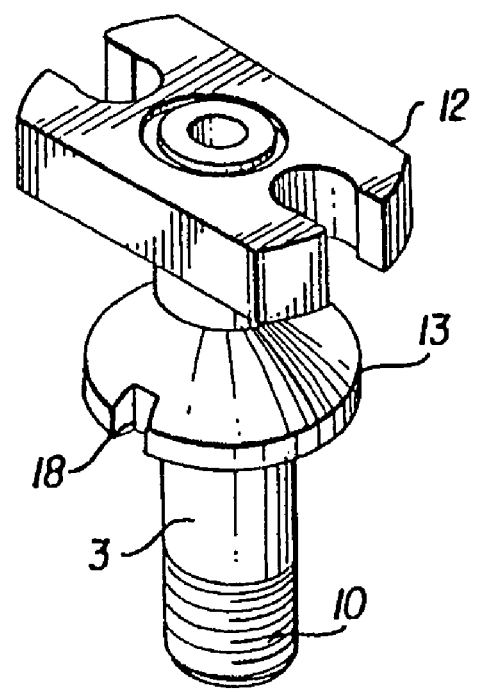
FIG. 3 is an enlarged view of the taps of the invention of FIGS. 1 and 2 to show detail thereof.

There are two tap assemblies required for each manifold (4) installation. Each tap assembly consists of three pieces. The tap (3), a first separate tubular member or stabilizing tube (2) and a second separate tubular member or stabilizing nut (1). The tap consists of a male NPT threaded end (1) and a flanged end (12). The flanged end (12) is for attachment to a conventional manifold (4). The tap (3) also includes a stabilizing flange (13) which is integral with the tap (3) and which is located between the NPT thread end (10) and the manifold connection flanged end (12).

The tap (3) is installed as follows. The stabilizing tube (2) and the stabilizing nut (1) are threaded together such that the stabilizing tube (2) is disposed within the bore of the stabilizing nut (1), as seen for example in FIG. 8. The tap (3) is inserted through bore (14) in the stabilizing tube (2) such that the outer surface of the tap (3) is spaced from the interior surface of the stabilizing nut (1) with a portion of the stabilizing tube disposed therebetween. The tap (3) is threaded into the orifice fitting (5). An enlarged first end portion of the stabilizing tube (2) has a flat surface (15) with two projections (16)(17). These two projections (16)(17) fit into mating recesses (18)(19) on the stabilizing flange (13) located on the tap (3). The stabilizing nut (1) is turned on a second end portion of the stabilizing tube (2). The projections (16)(17) on the stabilizing tube (2) prevent the stabilizing tube (2) from turning relative to the tap (3). The lower end of the stabilizing nut (1) is forced against the orifice fitting (5) while the upper end of the stabilizing tube (2) is forced against stabilizing flange (13) on the tap (3). When the assembly of stabilizing nut (1) and stabilizing tube (2) is placed in compression, the loads are transferred from the NPT threads of tap (3), via the stabilizing flange (13), onto the stabilizing tube (2) and stabilizing nut (1), which in turn bears on the orifice fitting (5).

Precision General Inc. (PGI) manufactures a stabilized futbol device, which is covered by their patent U.S. Pat. No. 4,920,626. In PGI's device the tap itself is threaded and the jam nut threads directly onto the tap.

In the invention, the stabilized tap assembly transfers the imposed loads through a larger area (the stabilizing flange), rather than just threads on the tap. As a result, there are lower stresses imposed on our tap rather than on PGI tap threads.

The same stabilized tap assembly can be used with orifice flanges (30) (instead of the orifice taps of FIG. 1) by using a flange shoe (20) (FIG. 7). The flange shoe (20) is shown on the cross sectional view of FIG. 8. The device works the same as described above except that the stabilizing nut (1) bears on the flange shoe (20). The flange shoe has two projections (22)(24) along opposite sides. Those projections are rounded, as shown on the drawings, and those projections bear on the flange. The flange shoe can be designed to fit all flange sizes and ratings.

It will be apparent to those skilled in the art that many modifications can be made to the invention without departing from the spirit or scope of the appended claims.

What is claimed is:

1. A tap assembly that attaches at least one of a manifold and pressure transmitter to an orifice, the tap assembly consisting essentially of:
   (a) a tap having an exterior surface, a male NPT threaded end, and a flanged end;
   (b) a separate stabilizing tube having an internal bore contiguous the exterior surface of the tap and an outer surface with external threads; and
   (c) a stabilizing nut threaded on the external threads of the separate stabilizing tube.

2. The tap assembly of claim 1, wherein the tap defines a straight passage that permits fluid communication between the orifice and the at least one of a manifold and pressure transmitter,
   the flanged end of the tap having at least one aperture that allows the tap assembly to be secured to the at least one of the manifold and pressure transmitter via a threaded fastener and the flanged end having a generally rectangular member having the at least one aperture extending generally orthogonally with respect to the straight passage of the tap, the aperture having a closed end proximate the passage and an opened end distal thereto,
   the tap having a stabilizing flange portion circumscribing the passage and disposed between the threaded end and the flanged end, the stabilizing flange portion having at least one recess disposed proximate the outer perimeter of the stabilizing flange portion.

3. The tap assembly of claim 1, wherein the separate stabilizing tube is a generally tubular member having a bore extending from a first end to a second end to define a passageway, and comprises:
   an outer surface that engages the stabilizing flange portion and includes a first portion with a flat surface having a first diameter and a second portion with a second diameter, the first diameter being greater than the second diameter, the flat surface having at least one projection that extends away from the flat surface towards the flanged end of the tap, the at least one projection being configured to mate with the at least one recess of the flanged portion of the tap.

4. The tap assembly of claim 1, wherein the stabilizing nut comprises an inner surface that defines a continuous gap between the inner surface of the nut and the exterior surface of the tap and a bottom flat surface generally orthogonal to the inner surface that engages a surface proximate the orifice.

5. A method of attaching a tap to an orifice, the tap including a male NPT threaded end, a flanged end, the tap having a bore extending between the male NPT threaded end and the flanged end, the method comprising:
   disposing the threaded end of the tap in the orifice;
   surrounding a portion of the tap with at least one member;
   engaging a first end surface of the at least one member with an area proximate the orifice; and
   abutting a second end surface of the at least one member with the tap.

6. The method of claim 5, wherein the abutting comprises engaging the second end surface with a stabilizing flange of the tap, the stabilizing flange having an outer perimeter greater than a perimeter of the orifice.

7. The method of claim 6, wherein the disposing comprises threading the tap.

* * * * *